United States Patent [19]

Takefuta et al.

[11] 4,262,787

[45] Apr. 21, 1981

[54] ELECTRO-MAGNETIC SPRING-WOUND CLUTCH

[75] Inventors: Hideyasu Takefuta; Toshio Yamaguchi, both of Higashi Matsuyama, Japan

[73] Assignee: Diesel Kiki Co., Ltd., Tokyo, Japan

[21] Appl. No.: 6,475

[22] Filed: Jan. 24, 1979

[30] Foreign Application Priority Data

Mar. 14, 1978 [JP] Japan .................... 53-31626[U]

[51] Int. Cl.³ .................... F16D 27/10; F16D 13/08
[52] U.S. Cl. .................... 192/84 T; 192/35
[58] Field of Search .................... 192/35, 84 T, 81 C, 192/84 B, 84 C, 89 B, 70.28, 30 V

[56] References Cited

U.S. PATENT DOCUMENTS

| 3,171,522 | 3/1965 | Petrie et al. | 192/70.28 |
| 3,565,223 | 2/1971 | Pierce | 192/84 C |
| 3,735,847 | 5/1973 | Brucken | 192/84 T X |

Primary Examiner—Rodney M. Bonck
Attorney, Agent, or Firm—David G. Alexander

[57] ABSTRACT

Input and output members (19), (28) and a clutch disc (32) are coaxially rotatable relative to each other, the clutch disc (32) being frictionally engageable with the input member (19). A coil-would spring (33) is wound around the input member (19) and connected at its ends to the clutch disc (32) and output member (28). An electromagnetic coil (26) may be energized to attract the clutch disc (32) into frictional engagement with the input member (19), causing the coil-wound spring (33) to tightly wind around the input member (19) and drivably connect the input member (19) to the output member (28). A spring (41) quickly and smoothly disengages the clutch disc (32) from the input member (19) when the coil (26) is de-energized. A plurality of pins (36) extending through the clutch disc (32) ensure parallel movement of the clutch disc (32) toward and away from the input member (19). The spring (41) is in the form of an annular plate spring and is resiliently flexed by means of hard rivets (43) projecting from a cover (34). The spring (41) slides on the rivets (43) during engagement and disengagement of the clutch disc (32), thereby minimizing friction and abrasion.

9 Claims, 6 Drawing Figures

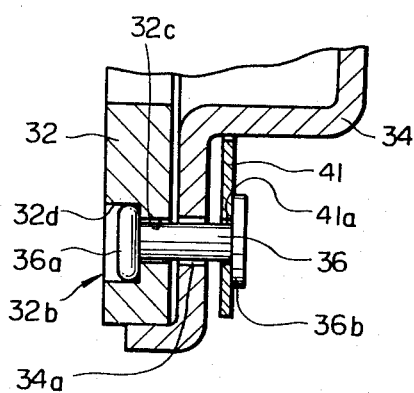
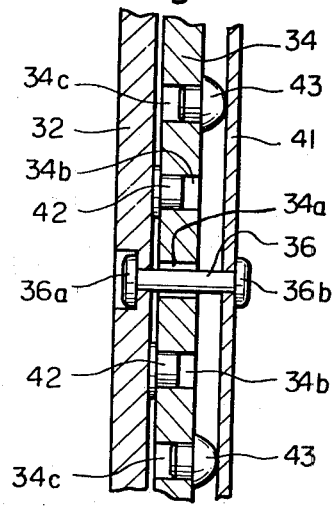
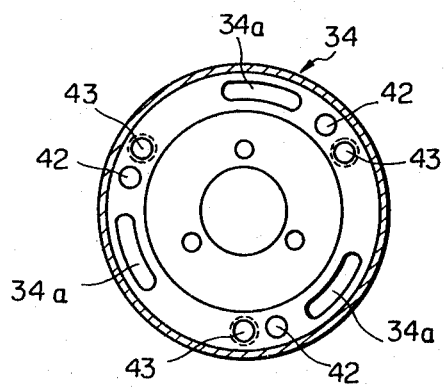
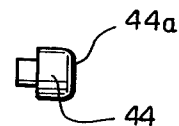
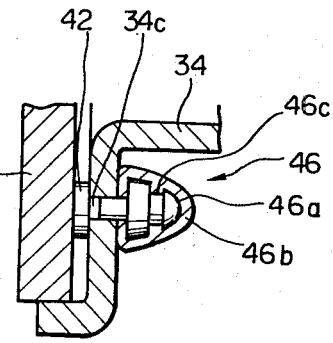

ELECTRO-MAGNETIC SPRING-WOUND CLUTCH

BACKGROUND OF THE INVENTION

The present invention relates to an improved electromagnetic spring-wound clutch which may be advantageously employed to connect an air conditioning compressor to an engine of an automotive vehicle. This invention constitutes a novel and advantageous improvement to an ELECTROMAGNETIC SPRING-WOUND CLUTCH disclosed in copending U.S. patent application Ser. Nos. 866,645, filed Jan. 3, 1978 (now U.S. Pat. No. 4,194,607, issued Mar. 25, 1980), 917,316, filed June 19, 1978 and 942,262, filed Sept. 14, 1978, (now U.S. Pat. No. 4,225,027, issued Sept. 30, 1980) which are assigned to the same assignee as this application.

An electromagnetic spring-wound clutch of the general type to which the present invention relates is disclosed in U.S. Pat. No. 3,735,847 and comprises coaxial input and output members. A clutch plate or disc is rotatably provided on the input member. Furthermore, a coil-wound spring is wound around the input and output members and connected at its opposite ends to the clutch disc and output member. An electromagnetic coil attracts the clutch disc into frictional engagement with the input member, causing the coil-wound spring to be tightly wound around the input and output members and drivably connect the input member to the output member. When the coil is de-energized, the clutch disc disengages from the input member, and the coil-wound spring releases the input member for rotation relative to the output member.

A major problem in this type of clutch is obtaining fast and smooth disengagement of the clutch disc. More specifically, the clutch disc tends to vibrate during disengagement, causing noise, and furthermore does not disengage completely parallel to the input member. In extreme cases, the clutch disc may be deformed or even break. A prior art attempt to overcome this problem involves an arrangement in which the coil-wound spring is stretched axially by the clutch disc when the coil is energized, and disengages the clutch disc when the coil is de-energized due to its resilience. However, due to the large spring constant required to drivably connect the input member to the output member, the coil must have an excessive magnetomotive force to stretch the coil-wound spring. Such a large coil cannot be fit into the clutch in a practical manner.

The problem is basically overcome by the novel improvement disclosed in the above mentioned U.S. patent application Ser. No. 866,645 by providing spring means and a plurality of pins to quickly and smoothly disengage the clutch disc from the input member while maintaining the clutch disc parallel to the input member. The spring means in one preferred form of the prior disclosure comprises an annular plate spring having axially projecting tabs or an annular wave spring. The clutch comprises a cover which protectively surrounds the coil-wound spring and has a radially outer flange portion which is formed with annular slots through which the pins extend. The pins further extend through holes formed through the clutch disc and annular spring and are formed with double heads which resiliently compress the spring and urge the clutch disc away from engagement with the input member and into engagement with the flange portion of the cover.

Although the basic improvement provides a substantial advance over the prior art, a problem has been encountered in actual manufacture of such a clutch. In order to enable deep drawing of the cover into the required shape, the cover must be made of a relatively soft low carbon steel. Due to the fact that the clutch disc and therefore the annular spring rotate relative to the cover during engagement and disengagement of the clutch, the engaging portions of the cover and annular spring rub together. Whereas there is but slight abrasion of the annular spring, which is made of a high carbon spring steel, frictional contact with the annular spring causes substantial abrasion of the cover and the formation of deep groove over a period of prolonged use of the clutch. This progressively reduces the force of the annular spring exerted on the clutch disc and the reliability of smooth disengagement of the clutch. After excessive use the clutch may finally fail to disengage.

Such abrasion of the cover may be eliminated by forming the cover of a high carbon steel and hardening the same by a quenching process. However, it is impossible to deep draw such a high carbon steel into the required shape for the cover. Another unsatisfactory expedient is to form the cover of a relatively low carbon steel and surface harden the same after press forming. However, practical problems are encountered regarding deformation of the cover during surface hardening and the additional manufacturing step which increases the production cost.

SUMMARY OF THE INVENTION

An electromagnetic spring-wound clutch embodying the present invention comprises a rotary input member, a rotary output member coaxial with the input member, a rotary clutch disc coaxial with the input member and frictionally engageable therewith, a coil-wound spring wound around the input member and being connected at its ends to the clutch disc and output member respectively, an electromagnetic coil which, when energized, attracts the clutch disc into frictional engagement with the input member, a cover member fixed to the output member and covering the coil-wound spring, the cover member being formed with arcuate slots and the clutch disc being formed with circumferentially spaced holes conjugate to the slots, double-headed pins extending through the slots and holes respectively, a resilient annular plate spring disposed between the cover member and heads of the pins which extend external of the cover member and a plurality of projecting members fixed to the cover member and engaging with the plate spring, the projecting members resiliently flexing the plate spring so as to urge the clutch disc to disengage from the input member.

It is an object of the present invention to provide an electromagnetic spring-wound clutch featuring greatly reduced frictional abrasion over the prior art.

It is another object of the present invention to provide an electromagnetic spring-wound clutch of increased mechanical durability over the prior art.

It is another object of the present invention to provide an electromagnetic spring-wound clutch with a longer service life and reduced maintenance requirements over the prior art.

It is another object of the present invention to provide an electromagnetic spring-wound clutch which disengages quickly and smoothly.

It is another object of the present invention to eliminate a major cause of vibration and noise in an electromagnetic spring-wound clutch.

It is another object of the present invention to eliminate a major cause of damage in an electromagnetic spring-wound clutch.

It is another object of the present invention to provide a generally improved electromagnetic spring-wound clutch.

Other objects, together with the foregoing, are attained in the embodiments described in the following description and illustrated in the accompanying drawing.

BRIEF DESCRIPTION OF THE DRAWING

FIG. 2 is a fragmentary sectional side elevation illustrating an important feature of the embodiment of FIG. 1;

FIG. 3 is a fragmentary sectional side elevation illustrating another important feature of the present invention;

FIG. 4 is a front elevation of a cover member of the present clutch;

FIG. 5 is an elevational view of a projecting member in the form of a rivet which constitutes a modification of the present invention; and FIG. 6 is a fragmentary sectional side elevational view illustrating another modified projecting member of the present invention.

DESCRIPTION OF THE PREFERRED EMBODIMENTS

Figure 1:
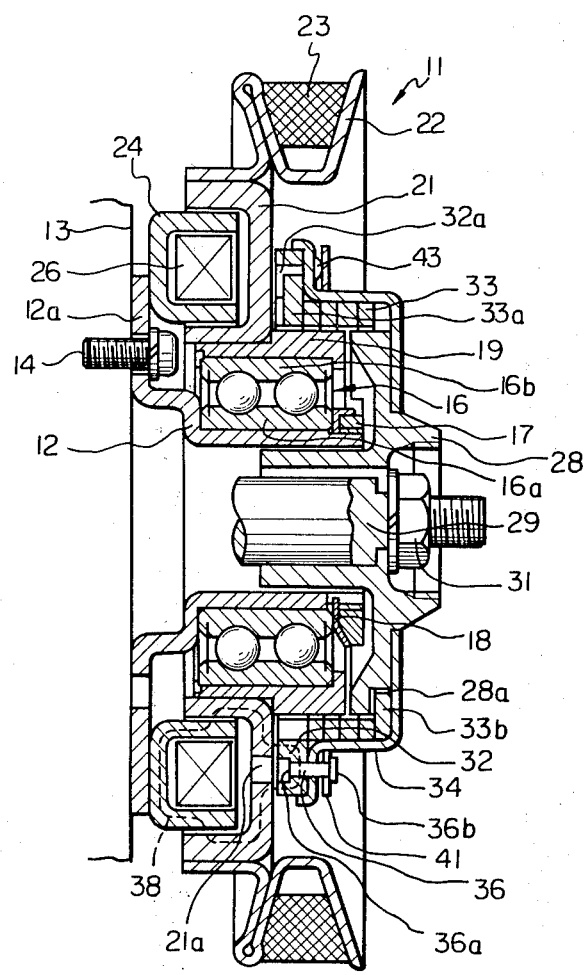
FIG. 1 is a sectional side elevational view of an electromagnetic spring-wound clutch of the present invention.

While the electromagnetic spring-wound clutch of the present invention is susceptible of numerous physical embodiments, depending upon the environment and requirements of use, substantial numbers of the herein shown and described embodiments have been made, tested and used, and all have performed in an eminently satisfactory manner.

Referring now to FIG. 1 of the drawing, an electromagnetic spring-wound clutch embodying the present invention is generally designated as 11 and comprises a tubular hub 12 which is rigidly mounted to a compressor 13 of an air conditioning system for an automotive vehicle (not shown) by means of a flange 12a of the hub 12 and bolts 14. An inner race 16a of a ball bearing 16 is fitted over the hub 12 and is rigidly held in place by means of a nut 17 screwed onto a threaded right end portion of the hub 12 and an intervening lock washer 18. A tubular input member 19 is tightly fit onto an outer race 16b of the bearing 16 and rigidly held in place by means of a reduced diameter right shoulder and a left end of the input member 19, the latter being crimped over the left end of the outer race 16b. An annular member 21 having a hollow cross-section is press fitted onto the input member 19. The left wall of the annular member 21 is cut away, and a plurality of circumferentially spaced, arcuate slots 21a are formed through the right wall of the annular member 21, although only one slot 21a is visible in the drawing. A pulley 22 is press fitted onto the annular member 21 and connected to an engine of the automotive vehicle (not shown) through a V-belt 23.

Another annular member 24 is welded to the flange 12a of the hub 12 and fits inside the hollow of the annular member 21 without touching the same. The right wall of the annular member 24 is cut away. Rigidly mounted inside the annular member 24 is an electromagnetic coil 26 which may be energized through leads which are not shown.

A generally tubular output member 28 is rotatably supported inside the hub 12. An output shaft 29 is threaded at its right end and rigidly fixed to the output member 28 by means of a nut 31 and conjugate shoulders of the shaft 29 and output member 28. The output shaft 29 is constituted by a drive shaft of the compressor 13, although the connection is not shown in detail.

An annular clutch disc 32 is rotatably provided around the input member 19. A coil-wound spring 33 is wound around the input member 19. One end of the spring 33 is connected to the clutch disc 32 by means of a radially outwardly extending tab 33a of the spring 33 which fits in a slot 32a formed in the inner circumference of the clutch disc 32. The other end of the spring 33 is connected to the output member 28 by means of a radially inwardly extending tab 33b of the spring 33 which fits in a slot 28a formed in the outer circumference of the output member 28. The clutch 11 further comprises a cover member 34 which is welded or otherwise firmly attached to the output member 28. The cover 34 encloses the coil-wound spring 33 and extends adjacent to the clutch disc 32. The radially outer portion of the generally cup-shaped cover 34 constitutes a flange portion (not designated).

As best seen in FIGS. 2 to 4, a plurality (3 or more) of arcuate slots 34a are formed through the outer portion of the cover 34 which faces the clutch disc 32. A pin 36 having left and right heads 36a and 36b respectively slidably extends through each slot 34a, the diameter of the pin 36 being substantially the same as that of the slot 34a. Conjugate to the slots 34a, circumferential spaced holes 32b are formed through the clutch disc 32. Each hole 32b comprises a small portion 32c having a width equal to the diameter of the pin 36 and a large portion 32d having a width greater than a diameter of the left head 36a of the pin 36. The clutch disc 32 is supported by the pins 36 and guided thereby for axial movement in parallelism with the annular member 21.

As best seen in FIGS. 3 and 4 the clutch 11 further comprises a plurality of resilient members or bumpers 42 made of plastic, rubber or the like which are press fitted into circumferentially spaced holes 34b in the cover 34 so as to face the clutch disc 32. Upon disengagement of the clutch disc 32 from the annular member 21 the clutch disc 32 is urged into engagement with the bumpers 42 rather than with the facing surface of the cover 34 as will become apparent from further description.

In accordance with an important feature of the present invention, the cover 34 is made of a relatively soft, low carbon steel to facilitate press forming and is formed with a plurality of circumferentially spaced holes 34c, with each hole 34c being circumferentially spaced between two adjacent holes 34b and slots 34a. Projecting members in the form of rivets 43 are press fitted in the holes 34c and project external of the cover 34 toward the spring 41. The rivets 43 are made of a material which is harder and more abrasion resistant than the cover 34, typically high carbon steel or high carbon chromium steel. The ends of the rivets 43 engage with the spring 41, thereby preventing the spring 41 from directly engaging with the cover 34. In accordance with another important feature of the present invention, portions of the spring 41 which engage with the rivets 43 are resiliently flexed external of or beyond the heads 36b of the pins 36, or rightwardly of the heads 36b as viewed in FIG. 3. This causes the spring 41 to exert an axial force on the clutch disc 32 through the pins 36 which urges the clutch disc 32 rightwardly away from the annular member 21 and toward engagement with the bumpers 42.

In operation, the input member 19, annular member 21 and pulley 22 are mutually coaxial and are driven by the V-belt 23 in an integral manner. The output member 28, output shaft 29 and cover 34 are also mutually coaxial and rotate as a unit.

With the coil 26 de-energized, the spring 41 urges the clutch disc 32 out of engagement with the annular member 21 and into engagement with the bumpers 42. The annular member 21 rotates relative to the clutch disc 32, which remains stationary. There is no driving connection between the pulley 22 and output shaft 29, and the output shaft 29 remains stationary.

To engage the clutch 11 and drive the compressor 13 from the pulley 22 by means of the output shaft 29, the coil 26 is energized with electric current. A magnetic circuit is established from the coil 26 through the slots 21a of the annular member 21 and the clutch disc 32 indicated by a phantom line curve 38 in FIG. 1. This attracts the clutch disc 32 leftwardly into frictional engagement with the annular member 21 against the force of the spring 41. The clutch disc 32 rotates with the annular member 21, winding the coil-wound spring 33 tightly around the input member 19. Due to the provision of the tabs 33a and 33b and slots 32a and 28a, the output member 28 is drivingly connected to the input member 19 through the clutch disc 32 and spring 33. The pulley 22, output shaft 29 and intervening components rotate as a unit, driving the compressor 13 from the engine. The rotational movement of the clutch disc 32 relative to the cover 34 necessary for winding the coil-wound spring 33 around the input member 19 is made possible by the slots 34a in the cover 34.

To disengage the clutch 11, the coil 26 is de-energized, thereby removing the magnetic attractive force from the clutch disc 32. The spring 41 immediately and smoothly moves the clutch disc 32 away from the annular member 21 and into abutting engagement with the bumpers 42.

It will be noted that the clutch disc 32 is maintained parallel to the annular member 21 by the pins 36, and thereby engages and disengages the annular member 21 in a completely smooth manner. Vibration, noise and damage to the clutch disc 32 are positively prevented by the spring 41 which immediately disengages the clutch disc 32 from the annular member 21 upon de-energization of the coil 26.

Although only one coil-wound spring 33 is shown and illustrated, it will be understood by those skilled in the art that two intertwined coil-wound springs may be provided.

It will be noted that the spring 41 needs to exert only a small force on the clutch disc 32 since it is necessary only to overcome frictional forces of the clutch disc 32 on the pins 36. Where the tabs 33a and 33b of the coil-wound spring 33 are axially slidably retained in the slots 32a and 28a of the clutch disc 32 and output member 28 respectively, the clutch disc 32 may move axially without axial expansion and contraction of the spring 33. Thus, the coil 26 does not have to exert a large force on the clutch disc 32, and may be of a small size suitable for the overall configuration of the clutch 11.

The bumpers 42 function to prevent impact and vibration of the clutch disc 32 against the cover 34. The rivets 43 serve the dual function of flexing the spring 41 so as to cause the spring 41 to exert an axial force on the clutch disc 32 through the pins 36 and to prevent abrasion of the relatively soft cover 34 by the relatively hard spring 41. During engagement and disengagement of the clutch disc 32, the spring 41 slides on the rivets 43 rather than the cover 34. Since both the rivets 43 and spring 41 are made of a hard and abrasion resistant material such as high carbon steel, abrasion of these elements is minimal even after prolonged operation of the clutch 11. Thus, the clutch 11 is smoother and quieter in operation, has a longer service life and reduced maintenance requirements over the prior art. The present invention further eliminates the manufacturing step of forming the annular spring into a wave shape or forming tabs on the spring.

If desired, the rivets 43 may be formed of a relatively soft base or core with only the ends which engage with the spring 41 hardened.

A modification of the rivets 43 is illustrated in FIG. 5. Here, each rivet 44 is formed with a substantially flat end 44a which engages with the spring 41. This arrangement serves to reduce the surface pressure at the engaging surfaces of the rivets 44 and spring 41 by distributing the pressure over a relatively larger area.

FIG. 6 shows another modification in which each rivet 46 comprises a metal base 46a which is press fitted into the respective hole 34c and a hard, low friction material 46b such as rubber or plastic which is thermally fused onto the base 46a. At least one annular groove 46c is formed in the base 46a to aid in retention of the material 46b to the base 46a. The rivets 46 feature yet further reduced vibration and noise due to reduced friction between the ends of the rivets 46 and the spring 41 during engagement and disengagement of the clutch disc 32.

In summary, it will be seen that the present invention overcomes the problems of the prior art and provides an electromagnetic coil-wound clutch which is completely free from vibration, noise and damage upon disengagement thereof. Various modifications will become possible for those skilled in the art after receiving the teachings of the present disclosure without departing from the scope thereof. For example, the clutch disc may be formed with arcuate slots and the cover formed with conjugate round holes in a manner opposite to that illustrated.

What is claimed is:

1. An electromagnetic spring-wound clutch comprising:
   a rotary input member;
   a rotary output member coaxial with the input member;
   a rotary clutch disc coaxial with the input member and frictionally engageable therewith;
   a coil-wound spring wound around the input member and being connected at its ends to the clutch disc and output member respectively;
   an electromagnetic coil which, when energized, attracts the clutch disc into frictional engagement with the input member;
   a cover member fixed to the output member and covering the coil-wound spring, the cover member being formed with arcuate slots and the clutch disc being formed with circumferentially spaced holes conjugate to the slots;

double-headed pins extending through the slots and holes respectively;

a resilient annular plate spring disposed between the cover member and heads of the pins which extend external of the cover member; and a plurality of projecting members fixed to the cover member and engaging with the plate spring, the projecting members resiliently flexing the plate spring so as to urge the clutch disc to disengage from the input member;

the projecting members being made of a harder material than the cover member.

2. A clutch as in claim 1, in which each projecting member is circumferentially spaced between two adjacent pins.

3. A clutch as in claim 1, in which the projecting members have substantially flat surfaces which engage the plate spring.

4. A clutch as in claim 1, in which the portions of the plate spring which engage with the projecting members are flexed beyond the heads of the pins which extend external of the cover member.

5. A clutch as in claim 1, further comprising a plurality of circumferentially spaced resilient members fixed to the cover member, the clutch disc being urged by the plate spring away from the input member into engagement with the resilient members.

6. An electromagnetic spring-wound clutch comprising:

a rotary input member;

a rotary output member coaxial with the input member;

a rotary clutch disc coaxial with the input member and frictionally engageable therewith;

a coil-wound spring wound around the input member and being connected at its ends to the clutch disc and output member respectively;

an electromagnetic coil which, when energized, attracts the clutch disc into frictional engagement with the input member;

a cover member fixed to the output member and covering the coil-wound spring, the cover member being formed with arcuate slots and the clutch disc being formed with circumferentially spaced holes conjugate to the slots;

double-headed pins extending through the slots and holes respectively;

a resilient annular plate spring disposed between the cover member and heads of the pins which extend external of the cover member; and a plurality of projecting members fixed to the cover member and engaging with the plate spring, the projecting members resiliently flexing the plate spring so as to urge the clutch disc to disengage from the input member;

the projecting members being rivets.

7. An electromagnetic spring-wound clutch comprising:

a rotary input member;

a rotary output member coaxial with the input member;

a rotary clutch disc coaxial with the input member and frictionally engageable therewith;

a coil-wound spring wound around the input member and being connected at its ends to the clutch disc and output member respectively;

an electromagnetic coil which, when energized, attracts the clutch disc into frictional engagement with the input member;

a cover member fixed to the output member and covering the coil-wound spring, the cover member being formed with arcuate slots and the clutch disc being formed with circumferentially spaced holes conjugate to the slots;

double-headed pins extending through the slots and holes respectively;

a resilient annular plate spring disposed between the cover member and heads of the pins which extend external of the cover member; and a plurality of projecting members fixed to the cover member and engaging with the plate spring, the projecting members resiliently flexing the plate spring so as to urge the clutch disc to disengage from the input member;

the cover member being made of low carbon steel and the projecting members are made of a material selected from the group consisting of high carbon steel and high carbon chromium steel.

8. An electromagnetic spring-wound clutch comprising:

a rotary input member;

a rotary output member coaxial with the input member;

a rotary clutch disc coaxial with the input member and frictionally engageable therewith;

a coil-wound spring wound around the input member and being connected at its ends to the clutch disc and output member respectively;

an electromagnetic coil which, when energized, attracts the clutch disc into frictional engagement with the input member;

a cover member fixed to the output member and covering the coil-wound spring, the cover member being formed with arcuate slots and the clutch disc being formed with circumferentially spaced holes conjugate to the slots;

double-headed pins extending through the slots and holes respectively;

a resilient annular plate spring disposed between the cover member and heads of the pins which extend external of the cover member; and a plurality of projecting members fixed to the cover member and engaging with the plate spring, the projecting members resiliently flexing the plate spring so as to urge the clutch disc to disengage from the input member;

each projecting member comprising a base and an end portion which is harder than the base and engages with the plate spring.

9. An electromagnetic spring-wound clutch comprising:

a rotary input member;

a rotary output member coaxial with the input member;

a rotary clutch disc coaxial with the input member and frictionally engageable therewith;

a coil-wound spring wound around the input member and being connected at its ends to the clutch disc and output member respectively;

an electromagnetic coil which, when energized, attracts the clutch disc into frictional engagement with the input member;

a cover member fixed to the output member and covering the coil-wound spring, the cover member being formed with arcuate slots and the clutch disc being formed with circumferentially spaced holes conjugate to the slots;

double-headed pins extending through the slots and holes respectively;

a resilient annular plate spring disposed between the cover member and heads of the pins which extend external of the cover member; and a plurality of projecting members fixed to the cover member and engaging with the plate spring, the projecting members resiliently flexing the plate spring so as to urge the clutch disc to disengage from the input member;

each projecting member comprising a base and a hard, low friction material fused on the base.

* * * * *